United States Patent [19]
Lebrun

[11] Patent Number: 6,065,451
[45] Date of Patent: May 23, 2000

[54] BYPASS VALVE WITH CONSTANT FORCE-VERSUS-POSITION ACTUATOR

[75] Inventor: Ivan Pierre Lebrun, Granger, Ind.

[73] Assignee: AlliedSignal Inc., Morristown, N.J.

[21] Appl. No.: 08/920,088

[22] Filed: Aug. 26, 1997

[51] Int. Cl.[7] .................................................. F02M 37/04
[52] U.S. Cl. ............................ 123/454; 123/455; 251/65
[58] Field of Search ................................... 123/452, 453, 123/454, 455; 251/129.03, 65

[56] References Cited

U.S. PATENT DOCUMENTS

| | | | |
|---|---|---|---|
| 3,106,934 | 10/1963 | Rogers et al. | 137/117 |
| 3,360,691 | 12/1967 | Paganelli | 317/123 |
| 3,502,105 | 3/1970 | Ernyei | 251/65 |
| 3,987,385 | 10/1976 | Diller et al. | 335/258 |
| 3,994,473 | 11/1976 | Wilke | 251/65 |
| 4,132,195 | 1/1979 | Bianchi | 123/455 |
| 4,147,146 | 4/1979 | Wessel | 123/453 |
| 4,220,129 | 9/1980 | Steinwart | 123/453 |
| 4,282,502 | 8/1981 | Nicholson | 335/266 |
| 4,319,211 | 3/1982 | Ueda et al. | 335/229 |
| 4,359,990 | 11/1982 | Kromer | 123/453 |
| 4,635,683 | 1/1987 | Nielsen | 137/625 |
| 4,648,368 | 3/1987 | Gmelin | 123/454 |
| 4,690,372 | 9/1987 | Thiebaud | 251/65 |
| 4,928,028 | 5/1990 | Leibovich | 310/23 |
| 4,988,074 | 1/1991 | Najmolhoda | 251/65 |
| 5,035,222 | 7/1991 | Feldinger | 123/454 |
| 5,252,938 | 10/1993 | Bishop | 338/274 |
| 5,295,627 | 3/1994 | Wahba | 239/585 |
| 5,327,112 | 7/1994 | Rossetti | 335/78 |
| 5,509,265 | 4/1996 | Benkosky et al. | 60/39 |

FOREIGN PATENT DOCUMENTS

| | | |
|---|---|---|
| 2339246 | 1/1976 | France . |
| 2245151 | 3/1974 | Germany . |

*Primary Examiner*—Carl S. Miller
*Attorney, Agent, or Firm*—Larry J. Palguta; Robert Desmond

[57] ABSTRACT

A control arrangement for a fuel system having a fuel pump (13) for supplying fuel through a variable orifice flow metering valve (15) to an engine main fuel control (45), the control (45) controlling the fuel pressure differential across the orifice of the metering valve (15). A head sensor includes a movable diaphragm (51), a bypass valve (47) for diverting fuel from the fuel pump away from the metering valve (15), and a coupling between the diaphragm (51) and the bypass valve (47) whereby the bypass valve (47) opens and closes in response to diaphragm (51) motion. The metering valve orifice fuel pressure differential is applied across the diaphragm (51) so that a valve spool (55) may open and close to maintain the pressure differential across the metering valve (15) substantially constant. A bias spring (54) normally biases the spool (55) closed. An electrically variable bias force may be applied to the diaphragm (51) to selectively increase or decrease the normally maintained pressure differential across the metering valve (15) and, therefore, also selectively increase or decrease the fuel flow to the engine. The electrically variable bias force is applied by a linear actuator (50, 80) which includes a helical actuating coil (61, 77), a rod (63; 79a,b,c) extending through the helical coil (61, 77) and a permanent magnet (59;73, 75) fixed to the rod (63; 79a,b,c) and spaced axially from the coil (61, 77). When an energizing current is supplied to the coil (61, 77), force is applied to the magnet (59;73, 75) which is generally proportional to the distance between the coil (61, 77) and the magnet (59;73, 75). A second force is also applied to the rod (63; 79a,b,c) and is generally proportional to rod position. The resultant of the two forces is substantially independent of the spacing between the coil (61, 77) and the permanent magnet (59;73, 75). When two magnets (73, 75) are used, the sum of the two distances from the coil (77) to the magnets (73, 75) is maintained constant.

11 Claims, 3 Drawing Sheets

BYPASS VALVE WITH CONSTANT FORCE-VERSUS-POSITION ACTUATOR

The present invention relates generally to linear actuators and more particularly to such actuators having substantially constant actuating force independent of the particular location of the actuating member. A preferred application of the actuator is in a fluid control valve for controlling the head or pressure differential across a variable size orifice. As a specific preferred environment, the present invention is described in the context of a fuel flow control for a helicopter engine.

It is known to accurately control fuel flow by striving to maintain a constant pressure differential across the orifice of a fuel metering valve. One known technique as described in U.S. Pat. No. 3,106,934 monitors the orifice pressure differential and controls a bypass flow upstream of the metering valve in response to changes in the monitored pressure differential.

In a pneumatic fuel control system as sometimes used in helicopter applications, during engine start when pneumatic levels needed to position the fuel metering valve are not sufficient to provide proper control, the engine can overheat ("overtemp") very easily. Also, when a step increase in helicopter rotor pitch is commanded, the fuel control response may not be fast enough to keep up with the load. In this case, the rotor may slow and there may be a momentary loss of altitude. When this condition occurs, it would be highly desirable to increase the head or pressure differential across the fuel metering valve to increase fuel flow and reduce the response time. Conventional head pressure control bypass arrangements may not adequately alleviate these problems. It would be highly desirable to augment a conventional head pressure bypass arrangement in order to alleviate these problems.

Conventional head pressure bypass arrangements respond to the pressure differential across the metering valve to appropriately position a spool valve and that valve regulates the flow of bypassed fuel. A solenoid could be used to provide a correction or trimming of the spool valve position under certain operating conditions, but the nonlinear nature of most such solenoids would result in different and unpredictable corrections being applied depending on the particular spool location at the time the correction is applied.

In a conventional solenoid having a ferromagnetic cased coil and ferromagnetic plunger movable into the coil, the force on the plunger rapidly increases as the plunger enters the coil because of the rapid rate of change of the reluctance of the magnetic path. The force then becomes relatively constant so long as the plunger is within the casing and has not engaged any stop. The longer the coil configuration is in relation to its diameter, the more nearly constant the force becomes. It is also known that a relatively uniform magnetic field can be created using a pair of Helmholtz coils. These Helmholtz coils are a pair of coils spaced apart on a common axis and connected in series. Other types of solenoids, such as the type having axially spaced apart permanent magnet and coil, generally do not have constant force verses position characteristics. It would be highly desirable to provide an actuator which produces the same force in response to a given current independent of the particular actuator position.

It is desirable to provide a compact, economical bypass valve trim for a fuel control bypass valve, and to provide such a valve trim having constant force-verses-position characteristics.

The present invention provides solutions to the above by providing a linear actuator having generally cylindrical symmetry about its axis of actuation comprising:

a helical actuating coil;
a rod extending along the axis and through the helical coil;
a permanent magnet fixed to the rod and spaced axially from the coil, the magnet and rod being supported for limited axial movement relative to the coil; and
means for applying a second force to the rod which is generally proportional to rod position, whereby the resultant of the two forces is substantially independent of the spacing between the coil and the permanent magnet.

According to one aspect of the present invention, a bypass valve trim assembly will change the metering valve head in response to a current signal from an electronic control unit to the linear actuator. The change in head increases or decreases fuel flow to the engine depending on the current polarity to the trim coil.

FIG. 1 schematically illustrates a fuel control system in which the present invention finds particular utility;

Corresponding reference numerals indicate corresponding parts throughout the several views of the drawing.

Figure 1:
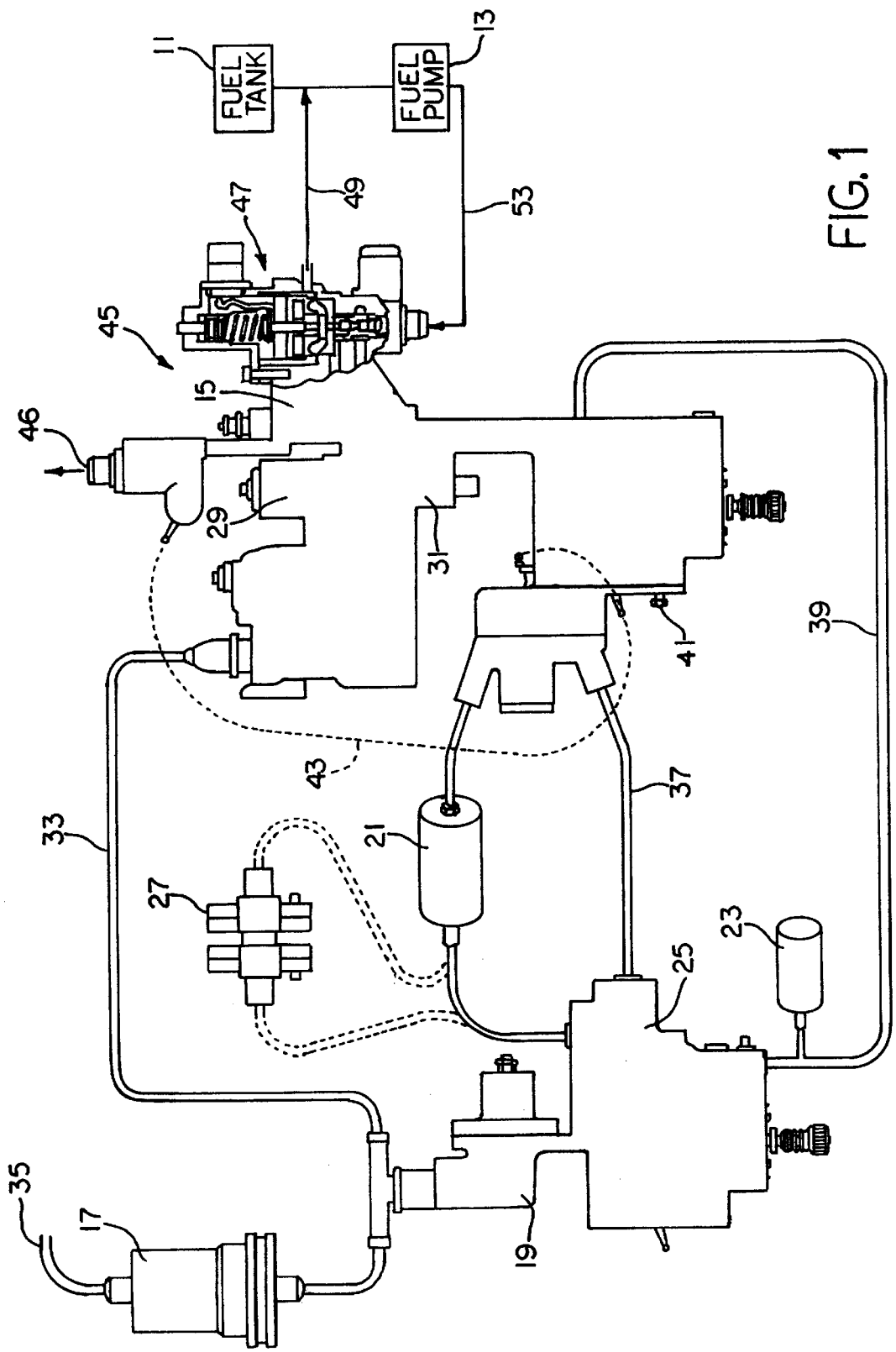

In FIG. 1, a portion of a fuel system having a fuel pump 13 for supplying fuel from a source 11 through a variable orifice flow metering valve 15 is shown. The system utilizes flowing pneumatic air circuits including inlet air filter 17, regulator valve 19, accumulators 21 and 23, a governor arrangement 25, a double check valve 27, and governor and accelerator bellows' 29 and 31 respectively. High or compressor discharge air pressure is found in lines such as 33, 35 while regulated air pressure is in line 37, and governor bellows air pressure is in line 39. Also included are an idle speed adjustment 41 and a throttle lever 43. The flowing pneumatic air circuits are used to compute engine fuel flow for all starting and load conditions for numerous helicopter applications. The operational pressures are derived from engine burner pressure. As noted earlier, this type of control system has inherent limitations in two respects. Firstly, the pneumatic pressures produced by the engine during round starts and cranking speeds are very low and cannot be used to adequately influence system requests to increase or decrease fuel flow. Consequently, high turbine inlet temperatures generated by rich fuel/air mixtures during engine light-offs cannot be corrected by intervention from the controlling pneumatic circuits and 'hot starts' can result. Secondly, pneumatic gasses are compressible in nature. This condition introduces computational time lags that affect the dynamic response of the control system metering function. Time lags adversely influence engine response during rapid power recovery transients on helicopters and produce an undesirable operational characteristic called rotor droop.

The flowing pneumatic control system of FIG. 1 and most other types of fuel control systems traditionally utilize a subcomponent identified as a main fuel control 45 to schedule fuel flow via an outlet 46 to the engine combustion chamber. The main fuel control meters fuel flow by varying the area of the metering valve orifice 15. The area of the metering orifice is varied as a function of numerous system inputs depending upon the complexity of the control system. The differential fuel pressure across the metering orifice is held nearly constant by a bypass valve 47 that returns excess fuel flow from the fuel pump 13 back to the inlet of the pump by way of line 49. This type of system produces a fuel metering function that varies directly with metering orifice 15 area and as the square root of the differential pressure.

Figure 2:
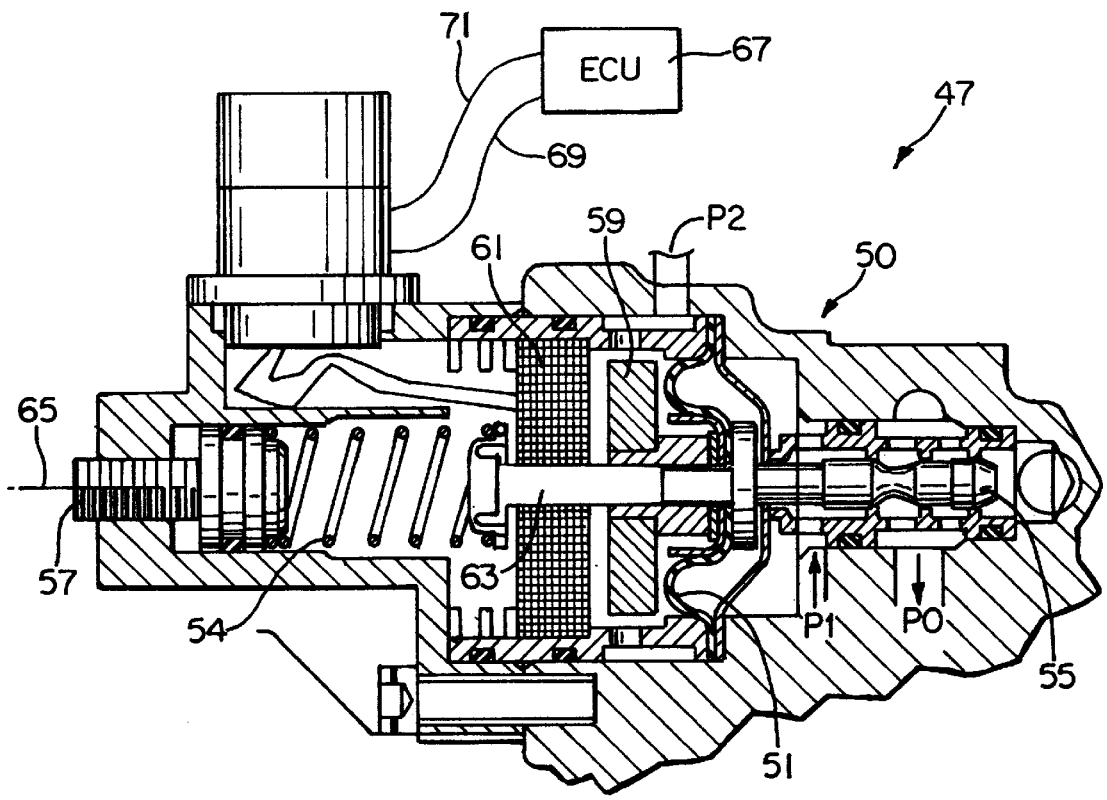
FIG. 2 shows a bypass valve suitable for use in the system of FIG. 1 and incorporating the present invention in one form.
Figure 3:
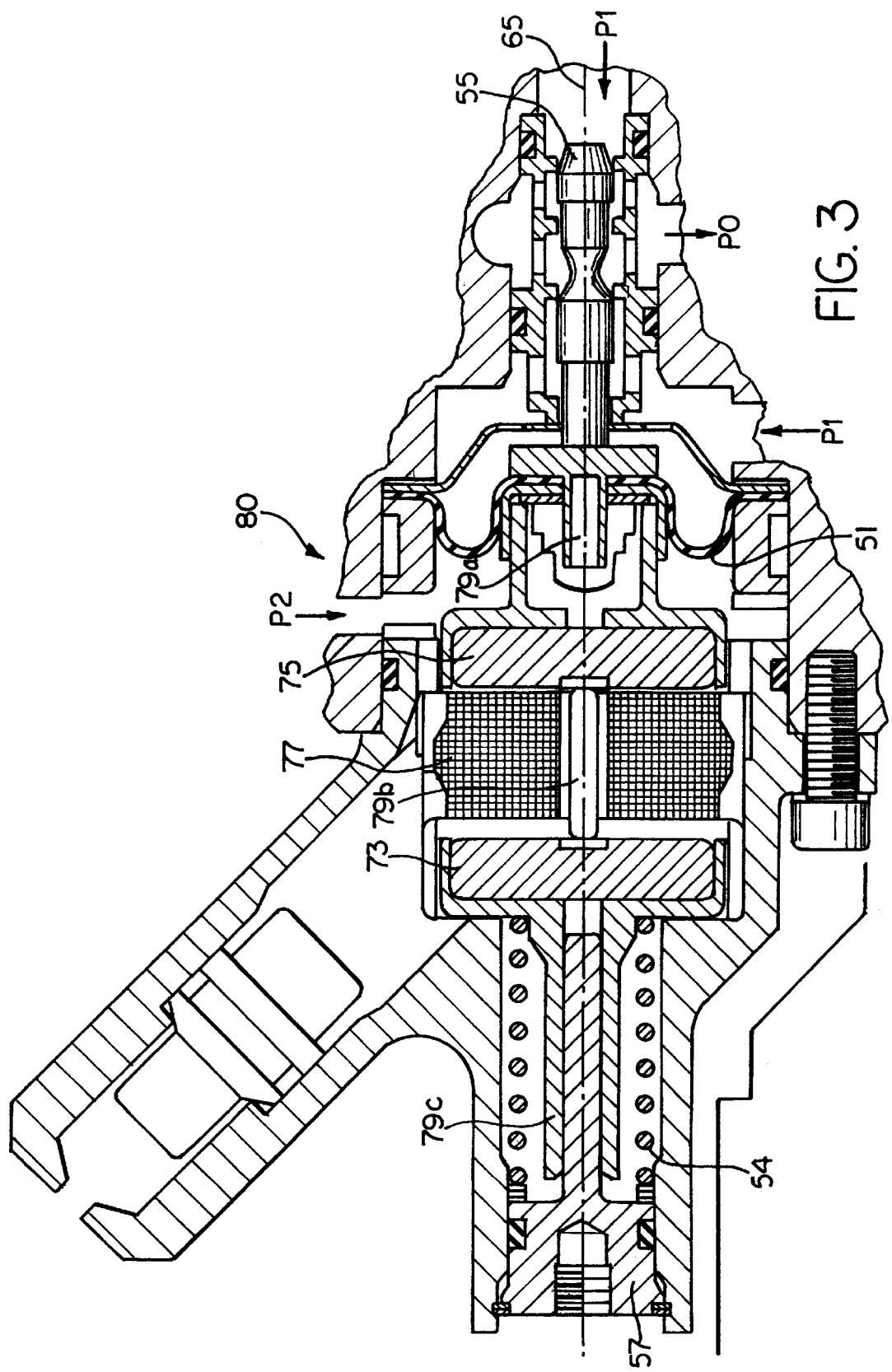
FIG. 3 shows a variation on the bypass valve of FIG. 2 illustrating the present invention in another form.

Normal operation of the bypass valve 47 is better understood in conjunction with FIGS. 2 or 3. Fuel pressure in line 53 from the outlet of pump 13 which is the same as the pressure at the high pressure or upstream side of the metering valve 15, is indicated as P1 and is applied to the right side of the diaphragm 51. Fuel pressure at the downstream side of the metering valve 15 is indicated as P2 and is applied to the left side of the diaphragm 51. So long as the differential P1–P2 does not exceed a prescribed value as determined by the coil spring 54, the spool 55 remains in its closed position. When that preferred pressure differential is exceeded, pressure on the right side of the diaphragm is sufficiently higher than P2 to move the diaphragm 51 and spool 55 to the left to open the dump of fuel to line 49 as indicated by PO. As thus far described, the operation of the bypass valve is conventional. A preferred pressure differential may be selected by adjusting screw 57 thereby changing the spring 54 bias on the diaphragm 51 so that a new pressure differential corresponds to a closed position of the spool 55.

Intermediate the spring 54 and diaphragm 51 is located an arrangement for applying a trimming or variable bias force to the diaphragm to selectively increase or decrease the normally maintained pressure differential across the metering valve and, therefore, also increase or decrease the fuel flow to the engine in the form of an electrically controllable linear actuator. The actuator 50 includes a permanent magnet 59 and a helical coil 61. The magnet is fixed to a nonmagnetic rod 63 which passes through the magnet 59 and engages the diaphragm 51. The actuator 50 has an axis of actuation 65 with the rod 63 being reciprocable along that axis. When unexcited, the coil 61 and magnet 59 are axially spaced from one another as shown.

As stated earlier, there are two situations when the actuator 50 is typically used. One is during engine start when pneumatic levels needed to position the metering valve 47 are not sufficient to provide proper control. During this period the engine can overtemp very easily. When an "overtemp" condition is sensed by the electronic control unit ("ECU") 67, current will be provided by way of lines 69 and 71 to the coil 61 to supply an energizing current to the coil and apply a first force to the magnet 59 which is generally proportional to the distance between the coil 61 and the magnet 59. This additional leftward force on the diaphragm 51 will open the bypass valve to decrease the metering valve head. The second condition where the actuator comes into play is when a step increase in helicopter rotor pitch is commanded. The fuel control response is not fast enough to keep up with the load, the rotor slows and there is a momentary lost of altitude. When this condition occurs, the electronic control unit will provide an opposite current to the coil 61, repelling the magnet 59 from the coil 61 to close the valve and increase the head, increase fuel flow and reduce the response time.

Figure 4:
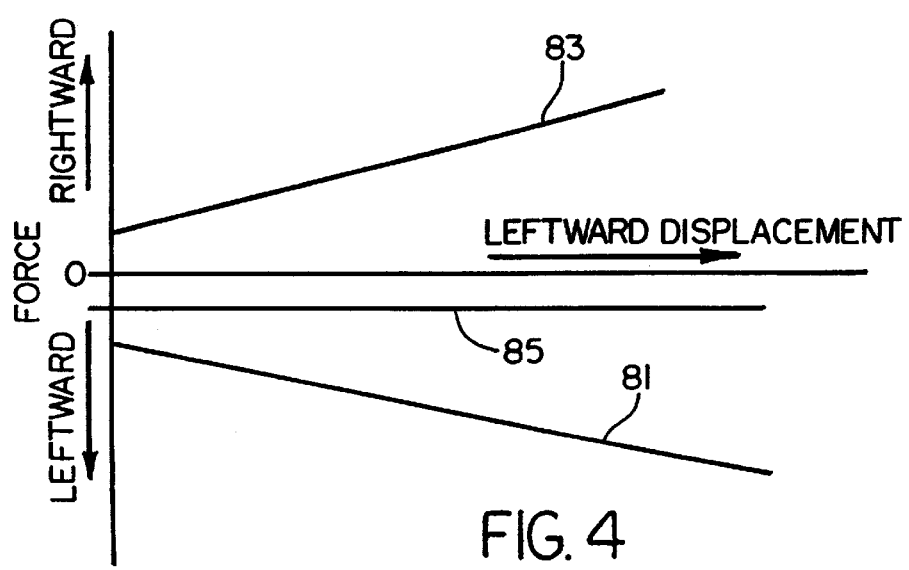
FIG. 4 illustrates the forces acting on the linear actuator of FIG. 2.

The force exerted on the magnet 59 is essentially proportional to the magnetic field gradient and varies linearly with the separation between the coil and magnet. This is illustrated in the graph of FIG. 4 by the line 81. Here, the ordinate represents rightward force and the abscissa represents leftward displacement. Thus, as the magnet moves toward the left, the leftward force of attraction becomes greater. There is a second force applied to the rod which is generally proportional to rod position. In FIG. 2, that second force is supplied by the bypass valve bias spring 54. As viewed, the spring 54 tends to force the magnet 59 and valve spool 55 toward the right and that force increases with leftward movement of the rod 63 as shown by the line 83 in FIG. 4. The force between the coil 61 and magnet 59 also increases with leftward movement of the rod 63, but the forces are in opposite directions resulting in an essentially location free resultant force as shown by the resultant 85 in FIG. 4.

In the event that the bypass valve 47 is open and the command from the electronic control unit 67 is to close it thereby increasing the fuel flow, both the spring 54 force and the force on the magnet 59 are toward the right, however, these forces are opposed by a force proportional to the pressure differential across the diaphragm 51. The difference between the spring and diaphragm forces is again linear, and the magnetic forces combine therewith to create a force which is substantially position independent.

This second force may also be derived from a second or companion permanent magnet such as magnet 73 (FIG. 3) which is fixed to the rod 79 on the side of the coil 77 opposite the first permanent magnet 75 of actuator 80. In this embodiment, as illustrated in FIG. 3, the magnets are oriented so that a given coil current will attract one while repelling the other. For example, both may have their north pole facing the coil. With this arrangement, as the rod 79a,b,c moves to the left, the force of, for example, attraction on magnet 73 decreases while the force of repulsion on magnet 75 increases, thus the resultant (here rightward) force remains substantially constant regardless of the locations of the magnets. Since spring 54 also applies a force to the rod 79a,b,c, it may be desirable to differentially size or space the two magnets to achieve the desired flat response.

In one preferred embodiment intended for relatively short duration operation, the coil 61 was formed of 26 gauge wire and about 0.3 inches in axial length with inside diameter 0.015 inches and an outer diameter of 1.15 inches. The maximum stroke was 0.6 inches. The input current was from –3 to +3 amperes while the force on the magnet varied from –2.5 to +2.5 LB. and the maximum on time was 5 seconds. Thus, in this example, the maximum limited axial movement of the magnet and rod relative to the coil was on the order of 50% of the outside diameter of the helical coil.

When used in concert with the electronic control unit, the application of the linear actuator to a flowing pneumatic system will correct both the start and rotor droop deficiencies previously described. The metered flow, which is normally pneumatically controlled, is modified or trimmed electrically and is, therefore, available before the onset of pneumatic pressure, and pneumatic time lags that contribute to rotor droop are eliminated. Improved start scheduling, acceleration control, overspeed and overtemp control, will be possible throughout the operational envelope.

What is claimed is:

1. A fuel system having a fuel pump for supplying fuel from a source through a variable orifice flow metering valve of a fuel control to an engine, including an improved control arrangement for controlling fuel pressure differential across the orifice of the metering valve comprising:

a head sensor including a movable diaphragm, a bypass valve for diverting fuel away from the metering valve, and a coupling between the diaphragm and the bypass valve whereby the bypass valve opens and closes in response to diaphragm motion;

means for replicating metering valve orifice fuel pressure differential across the diaphragm whereby the bypass valve may open and close to normally maintain the pressure differential across the metering valve substantially constant; and means for applying an electrically variable bias force to the diaphragm to increase or decrease selectively the normally maintained pressure differential across the metering valve and correspondingly increase or decrease the fuel flow to the engine, the means for applying comprising a linear actuator having an axis of actuation, a helical actuating coil, a rod extending along the axis and through the helical coil, a first permanent magnet fixed to the rod and spaced axially from the coil, the magnet and rod being supported for limited axial movement relative to the coil, means for supplying selectively an energizing current to the coil to apply a first force to the magnet which is generally inversely proportional to the distance between the coil and the magnet, and a second permanent magnet fixed to the rod on a side of the coil opposite the first permanent magnet, the means for supplying also effecting a second force to the rod which is generally inversely proportional to the distance between the coil and the second magnet, the resultant of the two forces being substantially independent of the spacing between the coil and the permanent magnets, the first force increasing as the second force decreases and the first force decreasing as the second force increases, whereby the limited axial movement of the rod is linearly proportional to the current to the coil while being independent of the axial position of the rod, thereby providing a linear adjustment of the position of the bypass valve and changing fluid flow accordingly.

2. The improved control arrangement of claim 1, wherein the means for replicating comprises a pair of chambers separated by the diaphragm, means for conveying the fuel pressure from one side of the orifice to one chamber, and means for conveying the fuel pressure from the other side of the orifice to the other chamber.

3. The improved control arrangement of claim 1, wherein the fuel pump has an inlet coupled to a fuel tank and an outlet coupled to a high pressure side of the metering valve, the bypass valve diverting fuel from the high pressure side of the metering valve back to the inlet of the fuel pump.

4. The improved control arrangement of claim 1, wherein the rod is nonmagnetic.

5. The improved control arrangement of claim 1, wherein the maximum limited axial movement of the first permanent magnet and rod relative to the coil is approximately 50% of the outside diameter of the helical coil.

6. A linear actuator having generally cylindrical symmetry about its axis of actuation comprising:

a helical actuating coil;

a rod extending along the axis and through the helical coil;

a first permanent magnet fixed to the rod and spaced axially from the coil, the magnet and rod being supported for limited axial movement relative to the coil, a second permanent magnet fixed to the rod on a side of the coil opposite the first permanent magnet; and means for supplying selectively an energizing current to the coil to apply a first force to the first magnet which is generally inversely proportional to the distance between the coil and the first magnet, the means for supplying also effecting a second force to the rod which is generally inversely proportional to the distance between the coil and the second magnet, the resultant of the two forces being substantially independent of the spacing between the coil and the permanent magnets, the first force increasing as the second force decreases and the first force decreasing as the second force increases, whereby the limited axial movement of the rod is linearly proportional to the current to the coil while being independent of the axial position of the rod, thereby providing a linear adjustment of the position of the rod.

7. The linear actuator of claim 6, wherein the rod is non-magnetic.

8. The linear actuator of claim 6, wherein the maximum limited axial movement of the first permanent magnet and rod relative to the coil is on the order of 50% of the outside diameter of the helical coil.

9. A fuel system of the type having a fuel pump for supplying fuel from a source through a variable orifice flow metering valve of a fuel control to an engine, including an improved control arrangement for controlling fuel pressure differential across the orifice of the metering valve comprising:

a head sensor including a bypass valve for diverting fuel away from the metering valve, means for determining the pressure differential across the metering valve, and coupling means connecting the means for determining with the bypass valve whereby the bypass valve opens and closes in response to variations in pressure differential across the metering valve to normally maintain the pressure differential across the metering valve substantially constant; and means for applying an electrically variable bias force to the diaphragm to increase or decrease selectively a normally maintained pressure differential across the metering valve and correspondingly increase or decrease the fuel flow to the engine;

the means for applying the electrically variable bias force comprising a linear actuator having an axis of actuation, a helical actuating coil, a rod extending along the axis and through the helical coil, a first permanent magnet fixed to the rod and spaced axially from the coil, the magnet and rod being supported for limited axial movement relative to the coil, means for supplying selectively an energizing current to the coil to apply a first force to the magnet which is generally inversely proportional to the distance between the coil and the magnet, and a second permanent magnet fixed to the rod on a side of the coil opposite the first permanent magnet, the means for supplying also effecting a second force to the rod which is generally inversely proportional to the distance between the coil and the second magnet, the resultant of the two forces being substantially independent of the spacing between the coil and the permanent magnets, the first force increasing as the second force decreases and the first force decreasing as the second force increases, whereby the limited axial movement of the rod is linearly proportional to the current to the coil while being independent of the axial position of the rod, thereby providing a linear adjustment of the position of the bypass valve and changing fluid flow accordingly.

10. The improved control arrangement of claim 9, wherein the fuel pump has an inlet coupled to a fuel tank and an outlet coupled to a high pressure side of the metering valve, the bypass valve diverting fuel from the high pressure side of the metering valve back to the inlet of the fuel pump.

11. The linear actuator of claim 9, wherein the rod is non-magnetic.

* * * * *